US012215807B2

(12) United States Patent
Kendrick (10) Patent No.: US 12,215,807 B2
(45) Date of Patent: Feb. 4, 2025

(54) IN-LINE SIGHT GLASS KIT AND ASSEMBLY (71) Applicant: Advanced Couplings Limited, Keighley (GB)

(72) Inventor: Keith James Kendrick, Shipley (GB)

(73) Assignee: Advanced Couplings Limited, Keighley (GB)

( * ) Notice: Subject to any disclaimer, the term of this patent is extended or adjusted under 35 U.S.C. 154(b) by 321 days.

(21) Appl. No.: 17/772,801

(22) PCT Filed: Oct. 29, 2020

(86) PCT No.: PCT/EP2020/080397
§ 371 (c)(1),
(2) Date: Apr. 28, 2022

(87) PCT Pub. No.: WO2021/084008
PCT Pub. Date: May 6, 2021

(65) Prior Publication Data
US 2022/0390049 A1 Dec. 8, 2022

Related U.S. Application Data (60) Provisional application No. 62/980,476, filed on Feb. 24, 2020, provisional application No. 62/927,245, filed on Oct. 29, 2019.

(51) Int. Cl.
*F16L 23/12* (2006.01)
*F16L 23/10* (2006.01)

(52) U.S. Cl.
CPC ............... *F16L 23/12* (2013.01); *F16L 23/10* (2013.01)

(58) Field of Classification Search
CPC .................................. F16L 23/10; F16L 23/12
See application file for complete search history.

(56) References Cited

U.S. PATENT DOCUMENTS 3,833,013 A  9/1974 Leonard
4,888,990 A * 12/1989 Bryan ..................... G01F 23/02
                                                  285/911

(Continued)

FOREIGN PATENT DOCUMENTS

| EP | 0645573 A2 | 3/1995 |
| EP | 3187763 A1 | 7/2017 |
| FR | 2 850 154 A1 | 7/2004 |

(Continued)

OTHER PUBLICATIONS

Henning Mobius, International Search Report regarding International Application No. PCT/EP2020/080397, Jan. 22, 2021, European Patent Office.

*Primary Examiner* — Eric S. McCall
(74) *Attorney, Agent, or Firm* — Sisson & Banyas, Attorneys at Law, LLC; Edwin A. Sisson (57) ABSTRACT

This specification discloses an in-line sight device sealed of a transparent tube surrounded by a tube body having a window. The tube body is attached to at least one flange via an attachment device which avoids any torque on the seal gasket. The flange and tube body are in direct contact with each other and the seal gasket is between the transparent tube and the flange having pressure applied in the same fixed volume and pressure each time the device is assembled.

18 Claims, 10 Drawing Sheets

(56) References Cited

U.S. PATENT DOCUMENTS

2005/0200129 A1    9/2005    Bongiorno
2018/0080589 A1    3/2018    Heon

FOREIGN PATENT DOCUMENTS

| GB | 1554304 A | 10/1979 |
| KR | 20160136822 A | 11/2016 |
| WO | 2008085633 A2 | 7/2008 |
| WO | 2015198038 A2 | 12/2015 |

\* cited by examiner

IN-LINE SIGHT GLASS KIT AND ASSEMBLY

CROSS REFERENCES AND PRIORITIES

This specification claims priority from International Application No. PCT/EP2020/080397 filed 29-10-2020, U.S. provisional application No. 62/927,245 filed 29-10-2019 and U.S. provisional application No. 62/980,476 filed 24-2-2020, the teachings of each of which are incorporated by reference.

BACKGROUND

It is known to use in-line sight transparent assemblies in the piping of chemical production. Pharmaceutical production uses these assemblies throughout its production.

The basic components of the in-line sight transparent assembly comprise the tube body, a transparent inner tube, and a flange on each end.

The inner diameter of the tube body is slightly bigger than the outer diameter of the transparent tube. Two O-rings are commonly used around the transparent tube and inside the tube body to center and cushion the transparent tube around the center of the tube body.

The tube body has at least one window allowing the viewer to see the contents inside the transparent tube.

Presently, the in-line sight transparent assemblies use threads at the end of the tube body and the end of the flanges to attach each flange to one end of the tube body.

A gasket is located between the end of the tube body and the flange with the gasket being placed under pressure to squeeze and deform it to create the seal between the flange and the transparent tube to prevent chemicals from leaking out from the assembly.

There have been many issues centering on the threads. First, the threads are not hygienic as they collect dust and other materials from the atmosphere.

Second, experience shows that threads are generally limited to lines of 6 inches (152 mm) in diameter or less.

Third, threads will gall, in particular at the larger diameters, especially those greater than 6 inches (152 mm).

Finally, the amount of pressure upon the gasket is variable. The field experiences many leaks with higher hardness gaskets, like polymer gaskets, due to the lack of force required to seal the unit. Elastomer gaskets are more compressible, yet under varying degrees of compression they will deform not enough (i.e. too little) or too much.

A goal of the assembly is to minimize the amount of ridges or lips in the line of flow. A gasket that is deformed too much will stick out of the gap between the transparent tube and the flange. A gasket that is not deformed enough (i.e. too little) will not fill the gap leaving a ridge in the ridge.

In both cases, the contaminants will build up at the lip or inside the ridge. In the case of line changes, cleaning is difficult and the material from the previous run becomes a contaminant for the next run.

Another problem with using threads is that the gasket will often bunch with the torque of twisting the threads of the flange and tube body together.

These problems can be illustrated by reference to FIG. 1.

Figure 1:
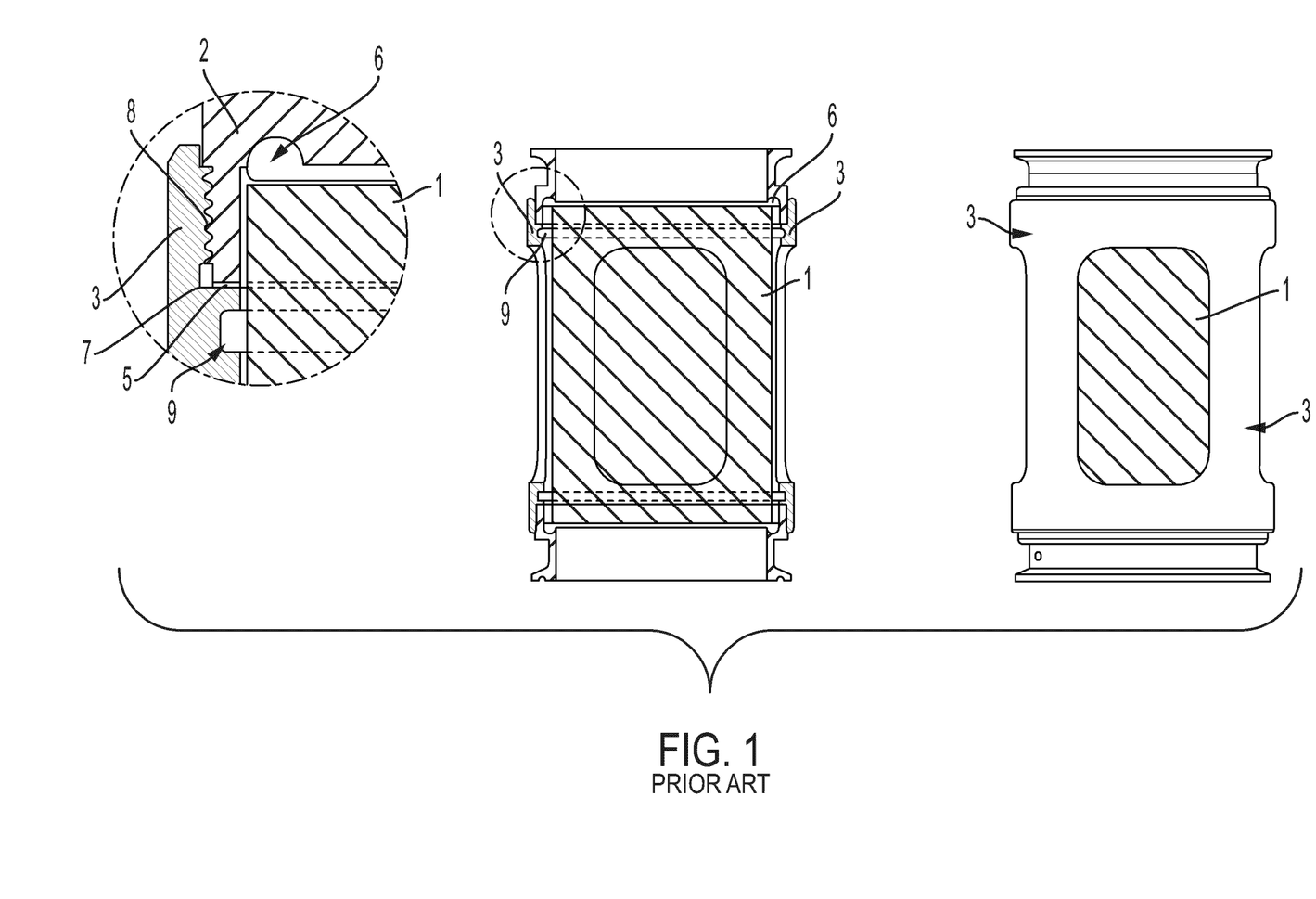
FIG. 1 is an embodiment of the prior art showing threads in the circled area.

FIG. 1 is a prior art assembly. It has a tube body [3]. Inside the tube body is a transparent tube [1]. The transparent tube is secured within the tube body with at least two placement holders, typically O-rings, which in this case is an O-ring with squared outer ends [9]. As shown in the embodiment the ends of the tube body are attached to flanges at the flange seal end with [2] pointing to the first flange seal end. There is an O-ring [5] between the first flange seal end and the tube body of the prior art embodiment. There is a seal gasket [6] between the first flange seal end and the transparent tube of the prior art embodiment.

As the tube body and flange seal end are connected via threads [8], there is at one point a gap [7] between the first flange connection seal and tube body at the end of the threads.

It is this gap which can cause the seal to be overtightened which will over compress the seal ring [6] and push it into the flow path or be under compressed and not push the seal ring to the inner edge of the gap between the flange seal end and the tube body causing a recession in the flow path.

There exists, therefore, the need for an assembly which does not use threads to connect the flanges to the tube body and create the pressure required for the seal.

SUMMARY

This specification discloses an assembly and kit for the assembly of an in-line sight glass comprising an assembly longitudinal axis, a tube body, at least a first flange, a transparent tube, at least a first seal gasket, at least a first attachment mechanism.

The tube body has a tube body longitudinal axis, a tube body first end which has a tube body first end contact surface, a tube body second end, a tube body inside diameter, and at least one window.

The transparent tube has a transparent tube first end, a transparent tube first end contact surface, a transparent tube second end, a transparent tube second end contact surface, a transparent tube inside diameter, a transparent tube outside diameter which is less than the tube body inside diameter, a transparent tube longitudinal axis, and the transparent tube is located inside the tube body;

The first flange will have a first flange longitudinal axis, a first flange seal end, a first flange connection end, a first flange seal surface, a first flange set surface, with the assembly longitudinal axis, the tube body longitudinal axis, the transparent tube longitudinal axis, and the first flange longitudinal axis are on substantially the same line and the tube body first end contact surface touching the first flange set surface.

At least a portion of the first seal gasket is under pressure and in contact with the first flange seal surface and the transparent tube first end contact surface.

It is further disclosed that the kit and the in-line sight glass assembly further comprise a second flange, a second seal gasket and a second attachment mechanism (1500), wherein the tube body second end has a tube body second end contact surface.

The second flange will having a second flange longitudinal axis, a second flange seal end, a second flange connection end, a second flange seal surface, a second flange set surface (3500), with the assembly longitudinal axis and the second flange longitudinal axis substantially on the same line.

The tube body second end contact surface will touch the second flange set surface; and at least a portion of the second seal gasket is under pressure and in contact with the second flange seal surface and the transparent tube second end contact surface.

The assembly may further comprise at least an aseptic seat, an aseptic surface, and an aseptic gasket.

It is further disclosed that when assemble, there is at least one force applied to the first seal gasket parallel with the assembly longitudinal axis and there is no torque applied to the first seal gasket.

There may also be a first placement holder to place between the tube body and the transparent tube.

The specification further discloses that these elements be in the form a bubble trap.

The specification further discloses that these components can be provided as a kit having multiple elements and combinations of the described elements.

DETAILED DESCRIPTION

Disclosed herein is an in-line sight assembly. The in-line sight assembly is described below with reference to the Figures. As described herein and in the claims, the following numbers refer to the following structures as noted in the FIG.

- 1 is a transparent tube of a prior art embodiment.
- 2 is a first flange seal end of the first flange of a prior art embodiment.
- 3 is a tube body of a prior art embodiment.
- 5 is an O-ring between the first flange seal end and the tube body of a prior art embodiment.
- 6 is a seal gasket between the first flange seal end and the transparent tube of a prior art embodiment.
- 7 is a gap between the first flange connection seal and tube body at the end of the threads of a prior art embodiment.
- 8 is a thread mechanism engaging the first flange seal end with the tube body of a prior art embodiment.
- 9 is a placement holder keeping the transparent tube within the tube body of a prior art embodiment.
- 100 points to the assembly.
- 200 is the Assembly Longitudinal Axis.
- 1000 is the First Clamp.
- 1100 is the First Clamp First Half.
- 1110 is the First Clamp First Half Clamp Surfaces.
- 1150 is the First Clamp Second Half.
- 1200 is the First Clamp Bolt.
- 1300 is the First Clamp Nut.
- 1500 is the Second Clamp.
- 1600 is the Second Clamp First Half.
- 1610 is the Second Clamp First Half Clamp Surfaces.
- 1650 is the Second Clamp Second Half.
- 1700 is the Second Clamp Bolt.
- 1800 is the Second Clamp Nut.
- 2000 is the First Flange.
- 2030 is the First Flange Longitudinal Axis.
- 2100 is the First Flange Seal End.
- 2200 is the First Flange Connection End.
- 2300 is the First Flange Seal Surface.
- 2400 is the First Flange Aseptic Surface.
- 2500 is the First Flange Set Surface.
- 2600 is the First Flange Gasket Seat.
- 2700 is the First Flange End Inner Surface.
- 3000 is the Second Flange.
- 3030 is the Second Flange Longitudinal Axis.
- 3100 is the Second Flange Seal End.
- 3200 is the Second Flange Connection End.
- 3300 is the Second Flange Seal Surface.
- 3400 is the Second Flange Aseptic Surface.
- 3500 is the Second Flange Set Surface.
- 3600 is the Second Flange Gasket Seat.
- 3700 is the Second Flange End Inner Surface.
- 4000 is the Tube Body.
- 4030 is the Tube Body Longitudinal Axis.
- 4100 is the Window.
- 4200 is the Tube Body Inside Diameter.
- 4300 is the First Placement Holder Seat.
- 4350 is the Second Placement Holder Seat.
- 4400 is the Tube Body First End.
- 4450 is the Tube Body First End Contact Surface.
- 4475 is the Tube Body First End Aseptic Seat.
- 4480 is the Tube Body First End Aseptic Surface.
- 4490 is the Tube Body First End Seal Surface.
- 4500 is the Tube Body Second End.
- 4550 is the Tube Body Second End Contact Surface.
- 4575 is the Tube Body Second End Aseptic Seat.
- 4580 is the Tube Body Second End Aseptic Surface.
- 4590 is the Tube Body Second End Seal Surface.
- 4600 is the Length of the Tube Cavity created by the assembly.
- 5000 is the Transparent Tube.
- 5100 is the Transparent Tube First End.
- 5150 is the Transparent Tube Second End.
- 5200 is the Transparent Tube First End Contact Surface.
- 5250 is the Transparent Tube Second End Contact Surface.
- 5300 is the Transparent Tube Inside Diameter.
- 5350 is the Transparent Tube Outside Diameter.
- 5400 is the Transparent Tube Longitudinal Axis.
- 5450 is the Transparent Tube Length.
- 6000 is the First Placement Holder.
- 6010 is the First Placement Holder Inside Diameter.
- 6020 is the First Placement Holder Outside Diameter.
- 6100 is the Second Placement Holder.
- 6110 is the Second Placement Holder Inside Diameter.
- 6120 is the Second Placement Holder Outside Diameter.
- 6200 is the First Seal Gasket.
- 6300 is the Second Seal Gasket.
- 6400 is the First Aseptic Gasket.
- 6500 is the Second Aseptic Gasket.
- 6700 is the Second End Gap between the Second Flange Inner Surface and the Transparent Tube Second End Contact Surface.
- 6800 is the Second End Gap between the Second Flange Inner Surface and the Transparent Tube Second End Contact Surface.

7000 is an embodiment of the seals as applied to a bubble trap.
7100 is an entry port.
7150 is a liquid discharge port.
7200 is the vapor discharge port.

The background section identified problems with the prior art which are solved with the disclosed assembly.

Figure 2:
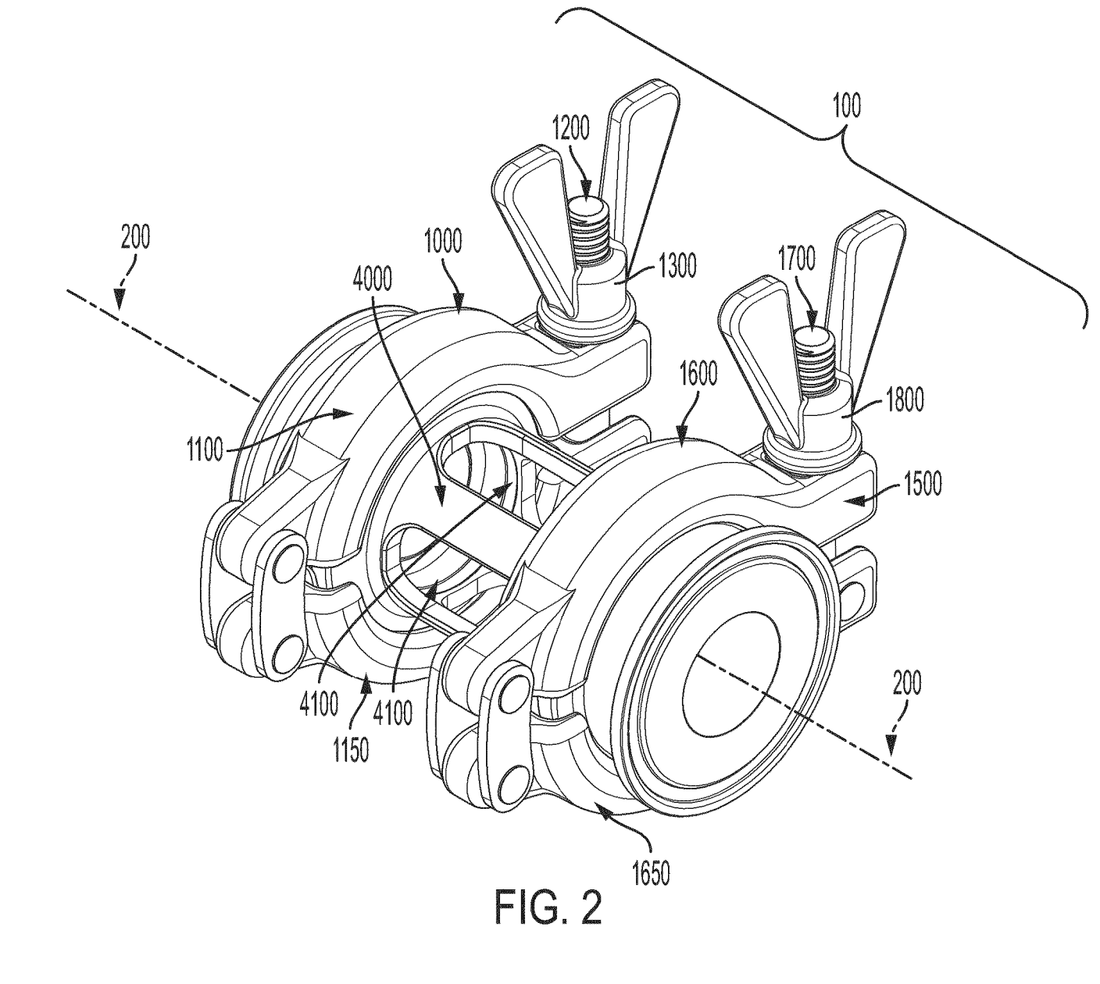
FIG. 2 is a perspective view of an embodiment of the disclosed assembly.
Figure 3:
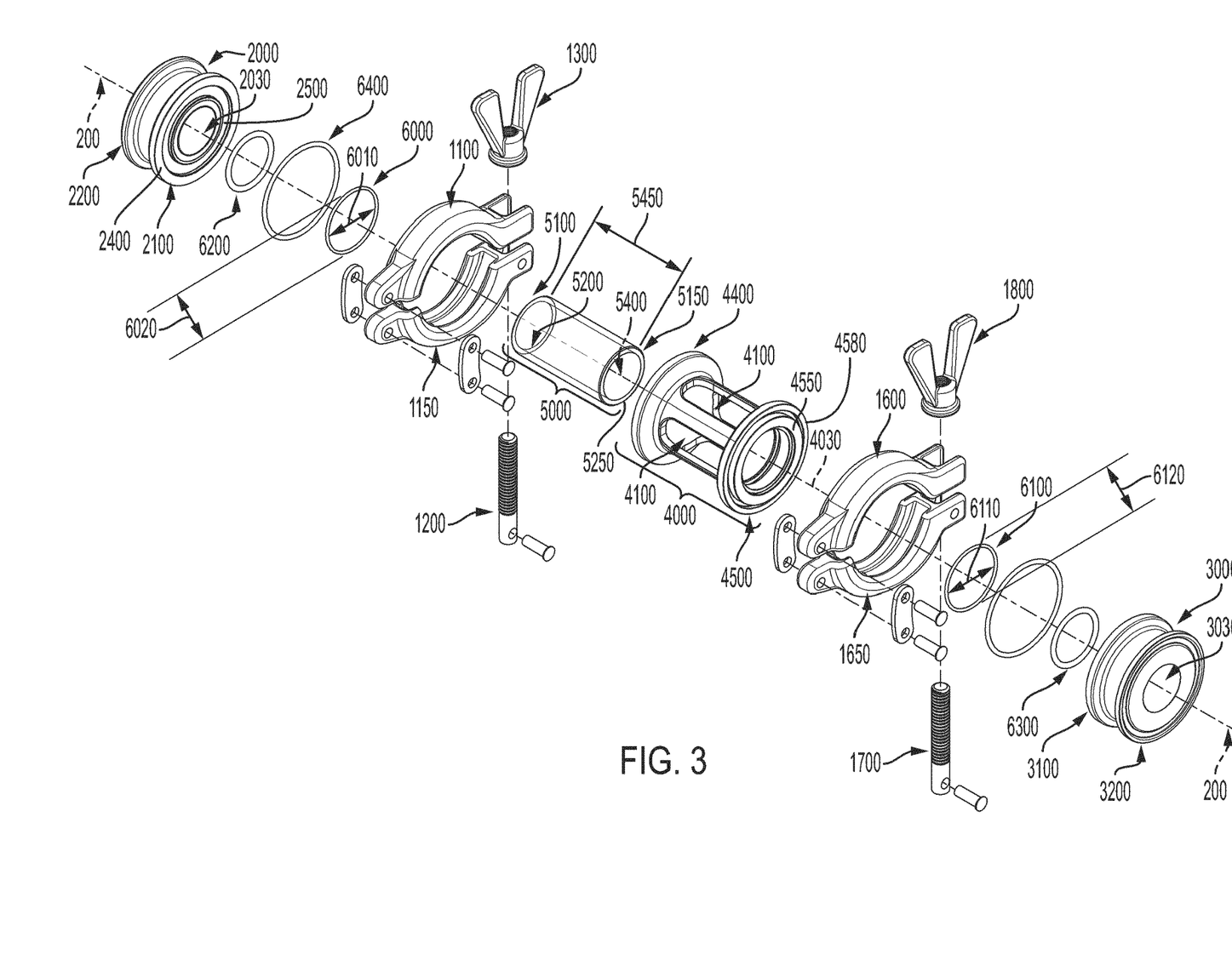
FIG. 3 depicts an exploded view of an embodiment of the assembly.
Figure 4:
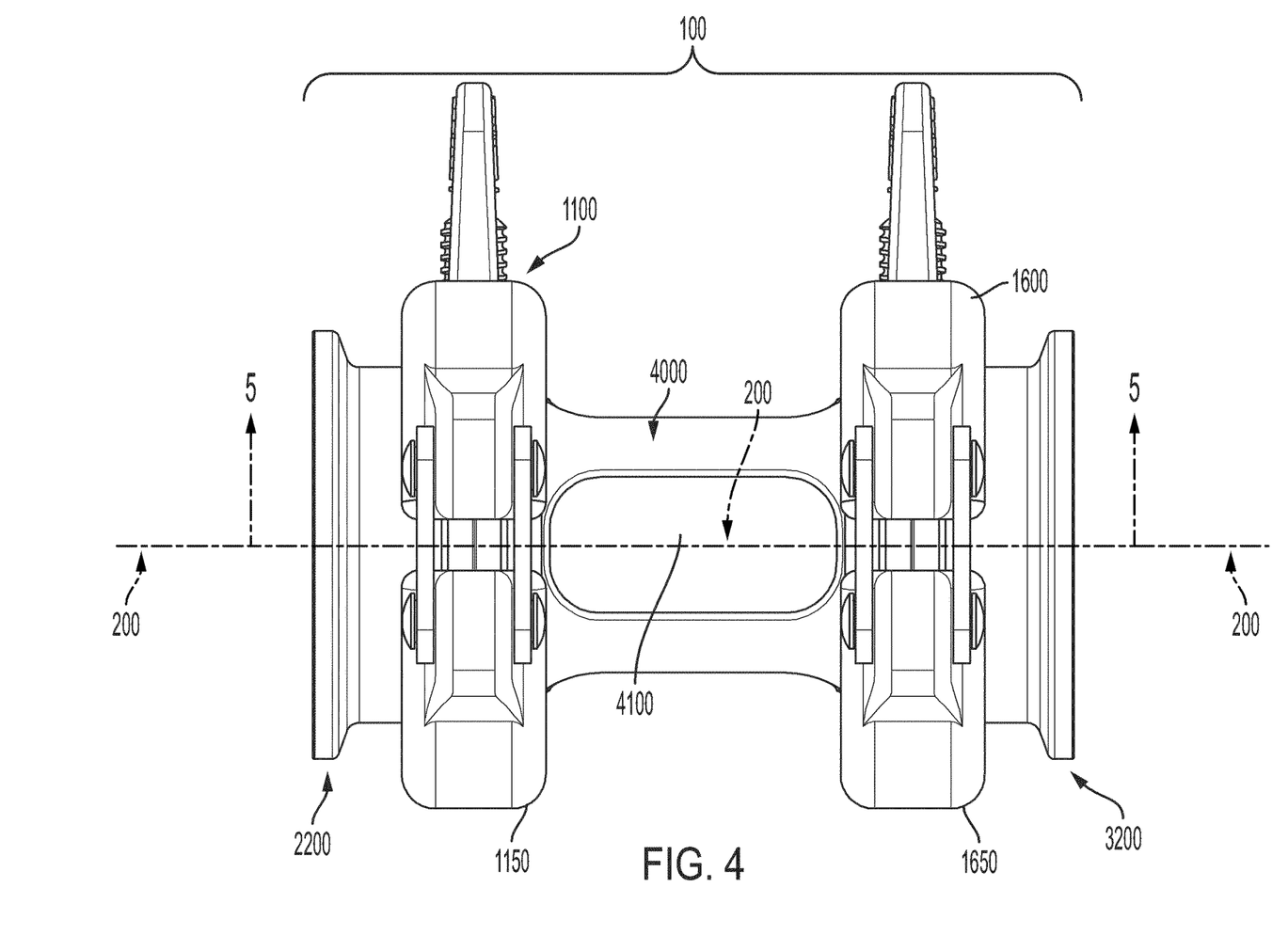
FIG. 4 depicts a side view of the assembly.

As shown in FIGS. 2 and 3, the assembly (100) and kit to assemble the assembly of the in-line sight glass comprises a tube body (4000), at least a first flange (2000), preferably a second flange (3000), a transparent tube (5000), at least a first seal gasket (6200), preferably a second seal gasket (6300) and at least a first attachment mechanism (1000) which in this embodiment is a clamp to connect the tube body with the first flange with preferably a second attachment mechanism (1500) which in this embodiment is a clamp, to connect the tube body with the second flange.

The tube body (4000) is a hollow cylinder encompassing a tube body longitudinal axis (4030) passing through the center of the circle formed by the cylinder wall. The tube body will have a tube body second end (4500) with a tube body second end contact surface (4550) opposite the tube body first end (4400) with a tube body first end contact surface (4450), a tube body outside diameter, and a tube body inside diameter (4200). There is generally at least one window (4100) in the tube body wall which is an opening passing through the tube body wall which allows viewing of the transparent tube and its contents during operation.

The tube body first end will have a tube body first end contact surface (4450) and the tube body second end may have a tube body second end contact surface (4550). These surfaces are preferably parallel to a radial plane of the tube body which is perpendicular to a tube body longitudinal axis (4030).

The tube body has a tube body length which is the maximum distance between any two points of the tube body that lie on a line parallel with the tube body longitudinal axis. In this embodiment, the tube body length is the distance between the tube body first end contact surface (4450) and the tube body second end contact surface (4550). If the tube body second end contact surface is not present then the length is measured from the tube body first end contact surface and the part of the tube body furthest away from the tube body first end contact surface on a line parallel with the tube body longitudinal axis.

The transparent tube (5000) is a hollow tube which is also a hollow cylinder having a transparent tube first end (5100), a transparent tube second end (5150) opposite the transparent tube first end, a transparent tube longitudinal axis (5400), a transparent tube first end contact surface (5200) which is in a plane perpendicular to the transparent tube longitudinal axis, a transparent tube second end contact surface (5250) which is also in a plane perpendicular to the transparent tube longitudinal axis, a transparent tube length (5450) which is the distance of a line parallel with the transparent tube longitudinal axis running from the transparent tube first end contact surface to the transparent tube second end contact surface, a transparent tube outside diameter (5350) and a transparent tube inside diameter (5300).

The material of construction of the transparent tube may be of any type, with the proviso that it be transparent meaning that at least 1% of the incident light having wavelengths in a range selected from the group consisting of infrared light, near infrared light, visible light, and black light or mixtures thereof can pass through the tube wall and into the tube. Glass and plastic provide good materials, provided they are transparent.

While at least 1% of the incident light is preferred, at least 75% of the incident light is also preferred and even at least 50% of the incident light being acceptable for some applications.

The transparent tube may not necessarily be transparent at all locations. For example, it may be desirable for only a small portion of the tube to be transparent. One could make the transparent tube and then wrap it in, or coat it with, a non-transparent material leaving smaller portion unwrapped or uncovered at a transparent spot in the transparent tube. In that case, the transparent spot of the transparent tube is to be aligned with the at least one window of the tube body.

The inner diameter of the tube body (4200) is slightly larger than the outer diameter of the transparent tube. Placement holders such as O-rings (6000 and 6100) are commonly used around the transparent tube and inside the tube body to center and cushion the transparent tube around the center of the tube body.

In the embodiment shown in FIGS. 1-6, the first placement holder (6000) has a first placement holder inside diameter (6010) and a first placement holder outside diameter (6020). The embodiment shown has a second placement holder (6100) having a second placement holder inside diameter (6110) and a second placement holder outside diameter (6120). These placement holders center the transparent tube in the tube body. In this manner the transparent tube longitudinal axis and the tube body longitudinal axis lie on substantially the same line, with lying on the same line, which is also called the assembly longitudinal axis, being the most preferred embodiment.

The first flange (2000) has a hole passing through its center being the first flange longitudinal axis (2030). The diameter of the hole is typically substantially equal to, or equal to, the transparent tube inner diameter. The first flange longitudinal axis passes through the center of the first flange hole and when assembled is preferably on the same line as the transparent tube longitudinal axis and the tube body longitudinal axis, which again is the assembly longitudinal axis.

The first flange also has a first flange seal end (2100) on a first end of the first flange hole with a first flange connection end (2200) on a second end of the first flange hole opposite the first flange seal end. The first flange seal end will have a first flange seal surface (2300). The first flange seal surface preferably defines a plane perpendicular to the first flange longitudinal axis, but it is not necessary.

The first flange seal end may also have a seal first flange gasket seat (2300) which is a void, or space, which forms a boundary for at least a portion of the first seal gasket (6200). The surface of the first flange gasket seat, when present, is considered part of the first flange seal surface.

In the shown embodiment the tube body first contact surface (4450) and the first flange set surface (2500) each define planes which are perpendicular to the tube body longitudinal axis and the first flange set surface, respectively. Because the tube body longitudinal axis and the first flange longitudinal axis are on the same line, the respective planes of the tube body contact surface and the first flange setting surface are both parallel to each other.

Figure 5:
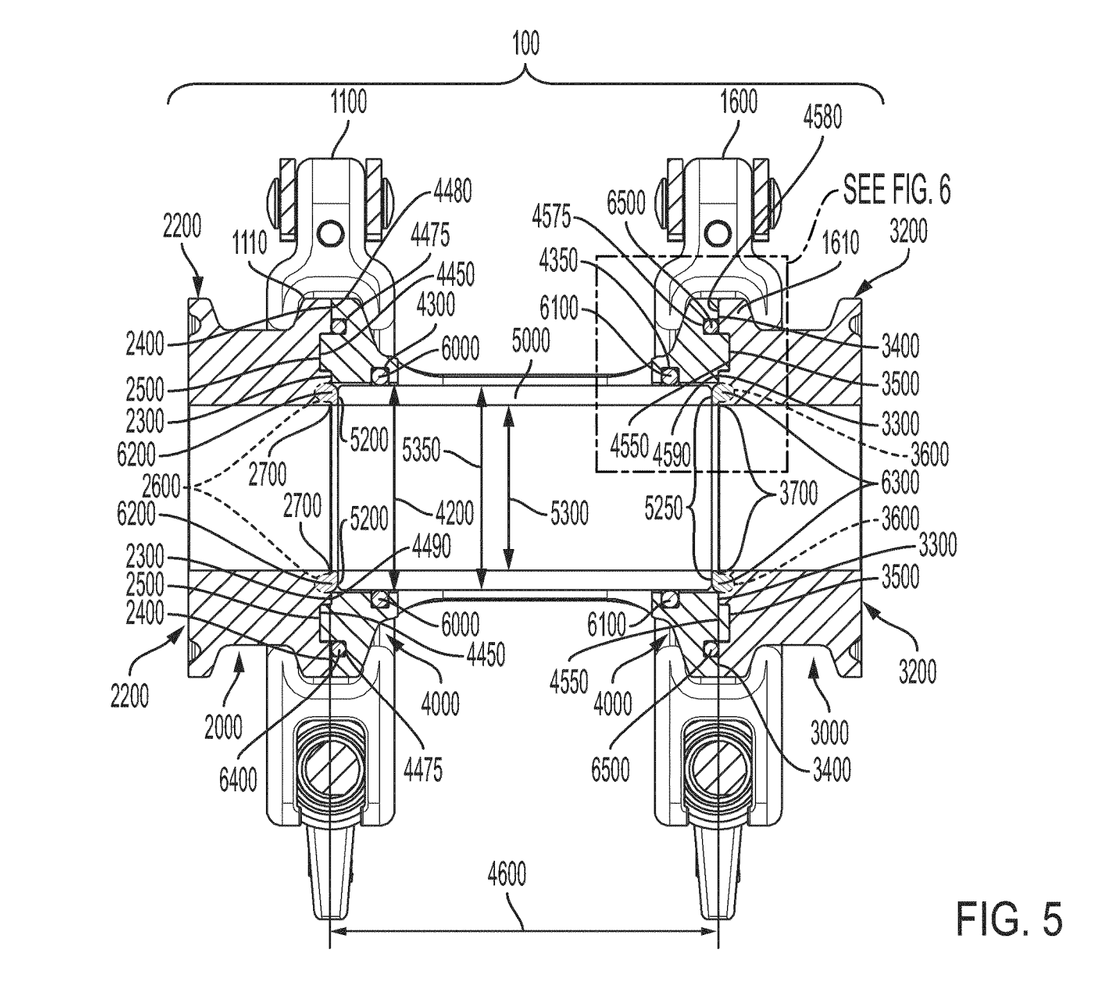
FIG. 5 is a cutaway side view of an embodiment of the assembly.
Figure 6:
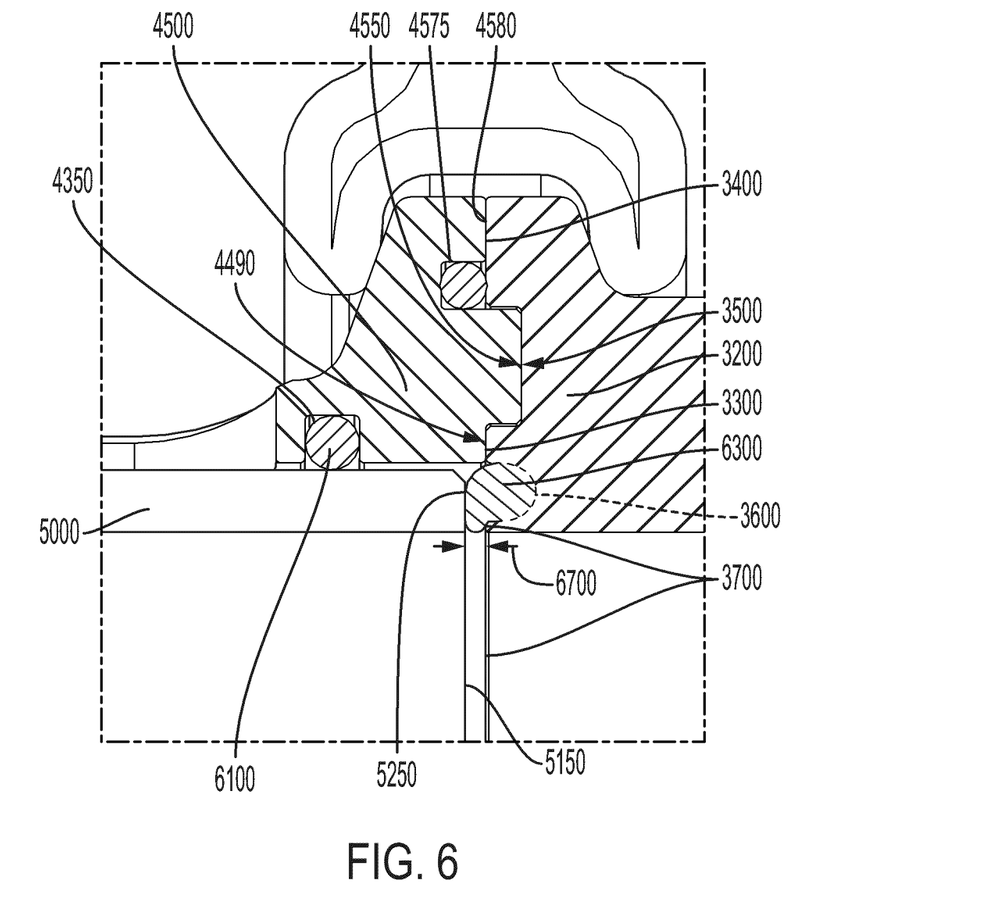
FIG. 6 is an enlarged cutaway view of the attachment section of the tube body and flange as indicated in FIG. 5.

The second flange, as depicted in FIGS. 5 and 6, is designed like the first flange. The second flange (3000), if present, has a hole passing through its center being the second flange longitudinal axis (3030) and the diameter of the hole being substantially equal to the transparent tube inner diameter. The second flange longitudinal axis passes through the center of the second flange hole and when assembled is preferably on the same line as the transparent tube longitudinal axis and the tube body longitudinal axis, which again is the assembly longitudinal axis.

The second flange also has a second flange seal end (3100) on a second end of the second flange hole with a second flange connection end (3200) on a second end of the second flange hole opposite the second flange seal end. The second flange seal end will have a second flange seal surface (3300). The second flange seal surface preferably defines a plane perpendicular to the second flange seal longitudinal axis, but it is not necessary.

The second flange seal end also has a seal second flange gasket seat (3300) which is a void, or space, which forms a boundary for at least a portion of the second seal gasket (6300). The surface of the second flange gasket seat, when present, is considered part of the second flange seal surface.

In the shown embodiment the tube body second contact surface (4550) and the second flange set surface (3500) each define planes which are perpendicular to the tube body longitudinal axis and the second flange set surface, respectively. Because the tube body longitudinal axis and the second flange longitudinal axis are on the same line, the respective planes of the tube body contact surface and the second flange setting surface are both parallel to each other.

One characteristic of the first or second flange gasket seat is that, when assembled, there will be a void for the first or second seal gasket, respectively, defined by the first and second transparent tube end, and the respective first and second flange gasket seat.

When assembled, the transparent tube body contact surfaces, and flange set surfaces touch. Because they are made of a non-deformable material such as steel, metal, rigid plastic, or the like, they cannot be any further longitudinally moved together. In this manner, the gasket space in which the seal gasket sits will always be constant.

The following table demonstrates how the surfaces align.

TABLE 1

Surface Matching of an Embodiment of the Assembly

| First End (Outside to Center) Left to Right FIG. 5 | | Second End (Outside to Center) Left to Right FIG. 5 | |
| --- | --- | --- | --- |
| First Flange | Tube Body First End | Tube Body Second End | Second Flange |
| Aseptic Surface (2400) | Aseptic Surface (4480) | Aseptic Surface (4580) | Aseptic Surface (3400) |
| Aseptic Surface (2400) | Aseptic Seat (4475) | Aseptic Seat (4575) | Aseptic Surface (3400) |
| Set Surface (2500) | Contact Surface (4450) | Contact Surface (4550) | Set Surface (3500) |
| Seal Surface (2300) | Seal Surface (4490) | Seal Surface (4590) | Seal Surface (3300)) |
| Gasket Seat (2600) | Seal Gasket (6200) at Transparent Tube Contact Surface (5200) | Transparent Tube Contact Surface (5250) the Seal Gasket (6300) | Gasket Seat (3600) |
| Inner Surface (2700) | Seal Gasket (6200) at Transparent Tube Contact Surface (5200) | Transparent Tube Contact Surface (5250) the Seal Gasket (6300) | Inner Surface (3700) |

In this manner, at least a portion of the first and second seal gasket will be in the respective first and second gasket seat and in contact with the respective first or second flange at the respective first and second gasket seat, which is also being in contact with the respective first and second seal surface and the first and second transparent tube end. When assembled each seal gasket will be under pressure from at least the respective transparent tube end contact surface and the respective flange gasket seat, i.e. part of the respective flange seal surface.

Because the amount of volume for a gasket is always fixed, the pressure upon that gasket and the gasket's deformation depend upon the gasket dimensions and material of construction. Because the longitudinal distance between the flanges is constant, there can be no over torqueing or under torqueing of the gasket in the field. As such, a replacement gasket of the same design will swell the same amount as the previous gasket. The human aspect of field torqueing is eliminated. This is true whether the gasket is flat or round, and whether it is in gasket seat or not.

The seal gasket may or may not deform under this pressure. However, it is preferred that the seal gasket deform and swell to the inside wall of the transparent tube end. In this manner, the small gap between the transparent tube end and the flange inner surface is filled. When looking at FIG. 6, the gap (6700) is the space between the second transparent tube second end (5150) at the transparent tube second end contact surface and the second flange inner surface (3700), which is also part of the second flange contact surface.

It is preferable that the flange seal end and the respective tube body end are each contoured so that at least a portion of a surface of the flange passes through the plane perpendicular to the tube body at the end of the tube body length. The contour is configured to allow for alignment of the tube body with the flange yet minimize movement perpendicular to the tube body longitudinal axis. As demonstrated in FIG. 6, the tube body second end contact surface goes past the plane located at the end of the flange which is perpendicular to the tube body longitudinal axis.

It is also noted that in the of embodiment of FIG. 6 the tube body second end contact is contoured so that its length matches the length of the second flange set surface along their points of contact.

Matching the length, or matches the length, does not mean that the lengths are equal. Matching the length means that one of the lengths is slightly greater than the other radial lengths so as to control, or even eliminate, the movement of the flange perpendicular to tube body longitudinal axis. This is consistent with FIG. 6 which has the tube body set surface present on protrusion that is inserted into a notch in the flange that has the contact surface inside the notch. As the length of the set surface is less than the length of the contact surface, the protrusion fits into the notch making the parts align with little or no movement perpendicular to the tube body longitudinal axis.

The embodiment shows the various contact surfaces on the tube body or the flanges are preferably each in its own plane which is perpendicular to the tube body longitudinal axis or the flange longitudinal axis. However, it is noted that at least one of the contact surfaces on the tube body end is preferably not in the same plane as the other tube body surfaces. Additionally, at least one of the surfaces at the flange seal end is preferably is not in the same plane as the other seal end surfaces.

It should be noted in FIGS. 5 and 6 that the compressed seal gasket (6300) fills the gap between the inner surface and tube contact surface. Although not indicated in FIGS. 5 and 6, the seal gasket on either end of the assembly should run vertically between the gap between the flange inner surface and the respective transparent tube contact surface. This is element 6700 in FIG. 6. The drawings intentionally do not show this so that the swelling of the gasket is emphasized.

As shown in the embodiment, the end of the outside of the tube body and the outside of the flange end are sloped consistent with the use of the disclosed clamp attachment mechanism to apply force inward towards the assembly longitudinal axis. It is well known that this attachment mechanism redirects the force to two separate forces which oppose each other parallel to the assembly longitudinal axis. There is no torque or twisting force in this assembly.

Applying the forces only in the directions parallel to the longitudinal axis can also be achieved by substituting the clamp in the embodiment with bolts and nuts with the bolts running parallel with the assembly longitudinal axis.

The clamp is the preferred attachment mechanism as it distributes the force equally throughout the part as it is being applied, whereas, the attachment mechanism of the bolt and nut applies a slightly higher force on the bolt and nut being tightened at any given moment in time.

In order to create the proper seal in the assembly a force is applied to the gasket. This force will depend upon the amount of work required to bring the tube body first end contact surface in contact with first flange end set surface and the tube body second end contact surface in contact with second flange end set surface. In the current embodiment the only forces applied to the gasket are parallel to the assembly longitudinal axis. The forces are equally applied to the gasket. There are no torque or twisting forces applied to the gasket. This eliminates the galling associated with the prior art which applies torque the tube body and the flange to twist each other along the threads Accordingly, this invention as embodied in the figures can be characterized as being void of threads on a tube body end, or both tube body ends, and void of threads on one, or both, flange seal ends. A preferred embodiment is also void of mated threads on the tube body and flange end. The preferred embodiment is also void of torque forces applied to the gasket. The only forces applied to the gasket are parallel, or substantially parallel, to the assembly longitudinal axis.

As shown in FIGS. 3-6, the assembly may further comprise aseptic seals. If this is desired the tube body may further comprise a first aseptic seat (4475) in which the first aseptic gasket (6400) will sit. The tube body may further comprise a second aseptic seat (4575) in which the second aseptic gasket (6500) will reside.

In such embodiments, the first flange will further comprise a first flange aseptic surface (2400) in contact with and placing pressure on the first aseptic gasket located in the tube body first aseptic seat. The second flange will further comprise a second flange aseptic surface (3400) in contact with and placing pressure on the second aseptic gasket located in the tube body second aseptic seat.

Figure 7:
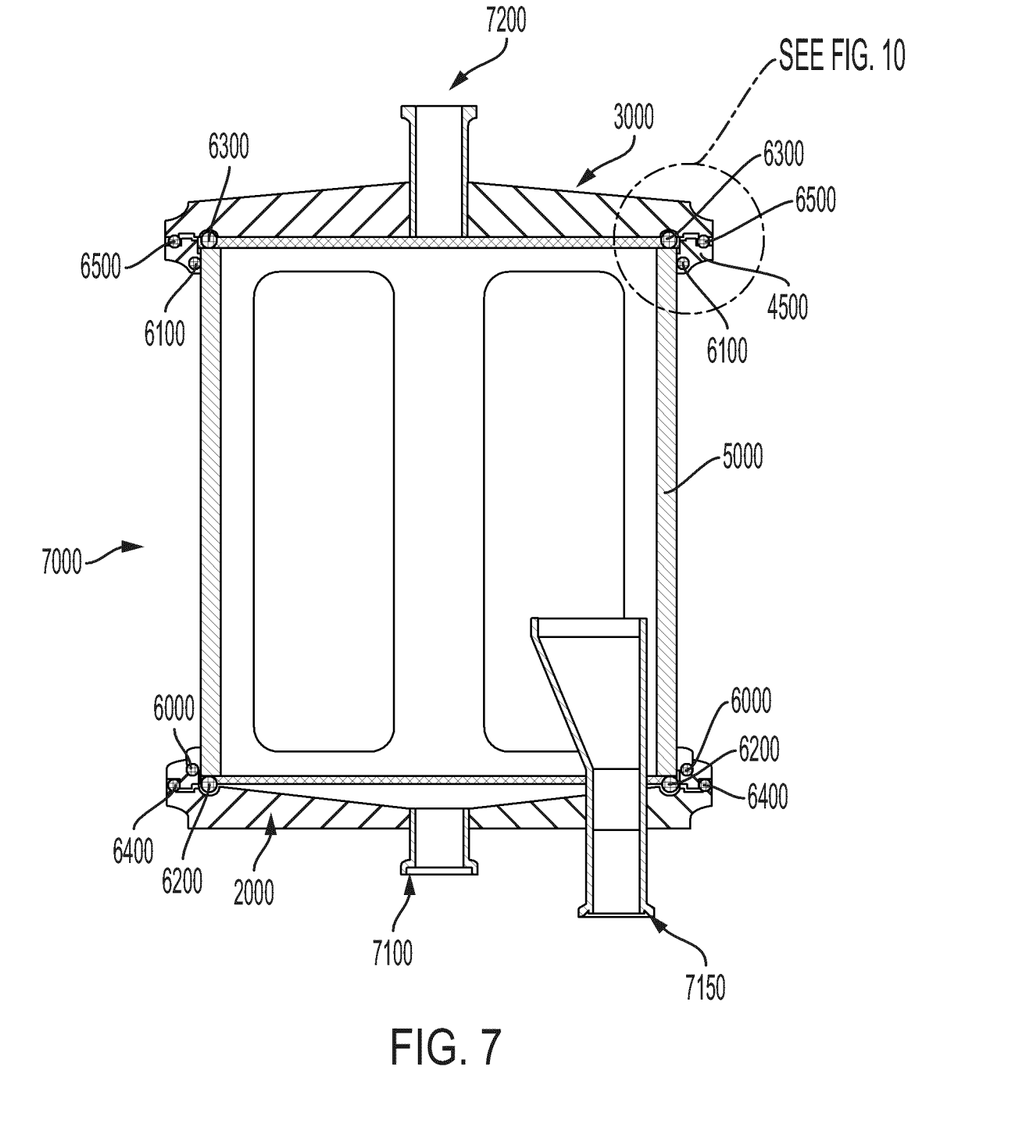
FIG. 7 is a cutaway view of a second embodiment in a bubble trap.
Figure 8:
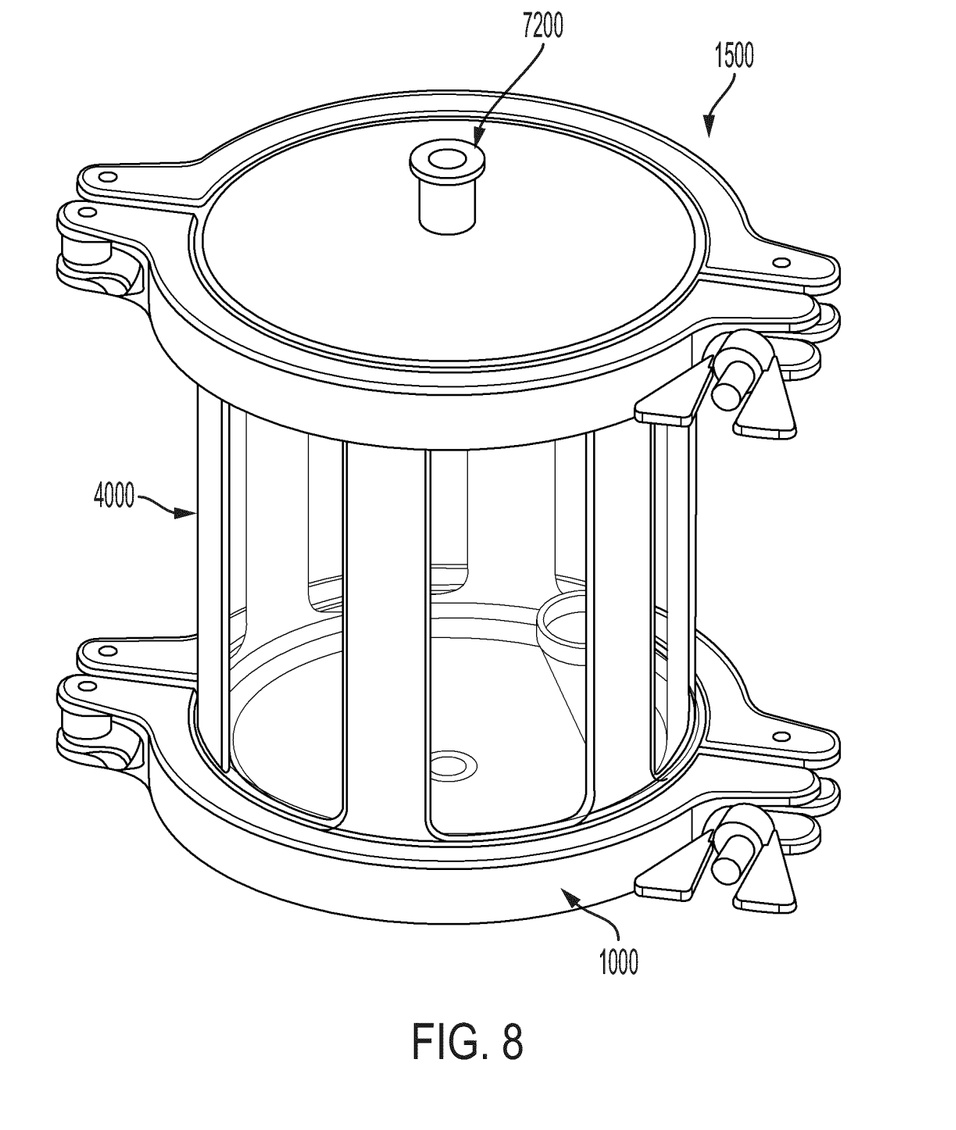
FIG. 8 is a perspective view of the second embodiment in a bubble trap.
Figure 9:
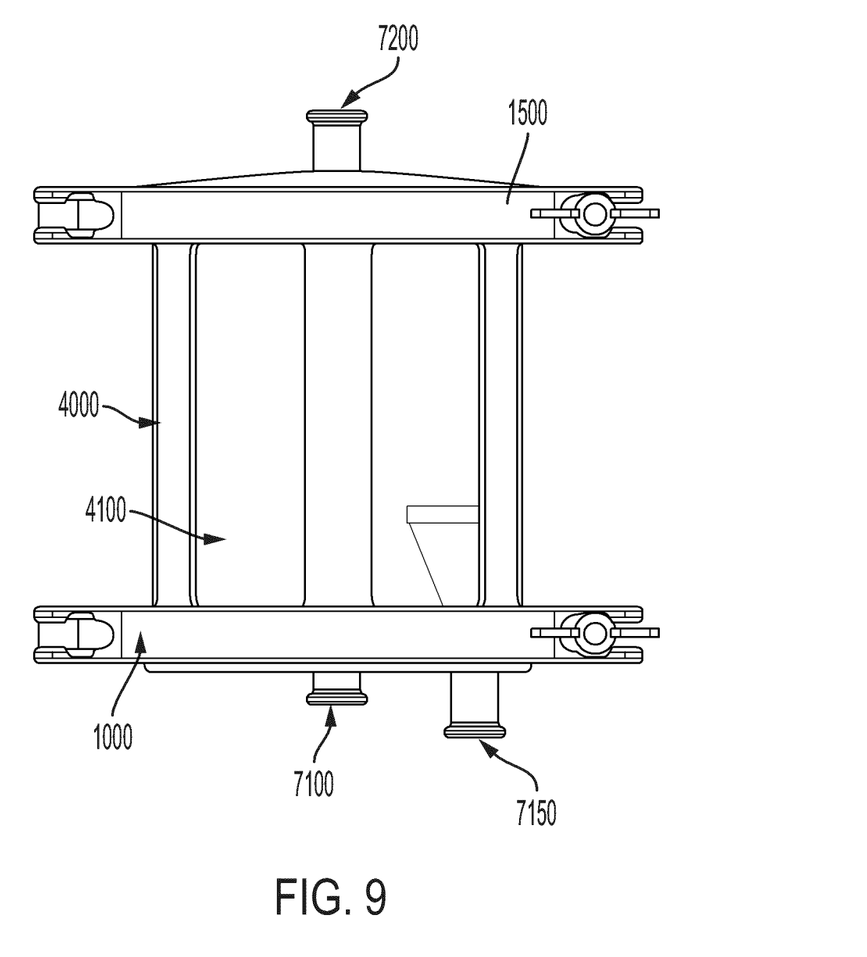
FIG. 9 is a straight on view of the second embodiment in a bubble trap.
Figure 10:
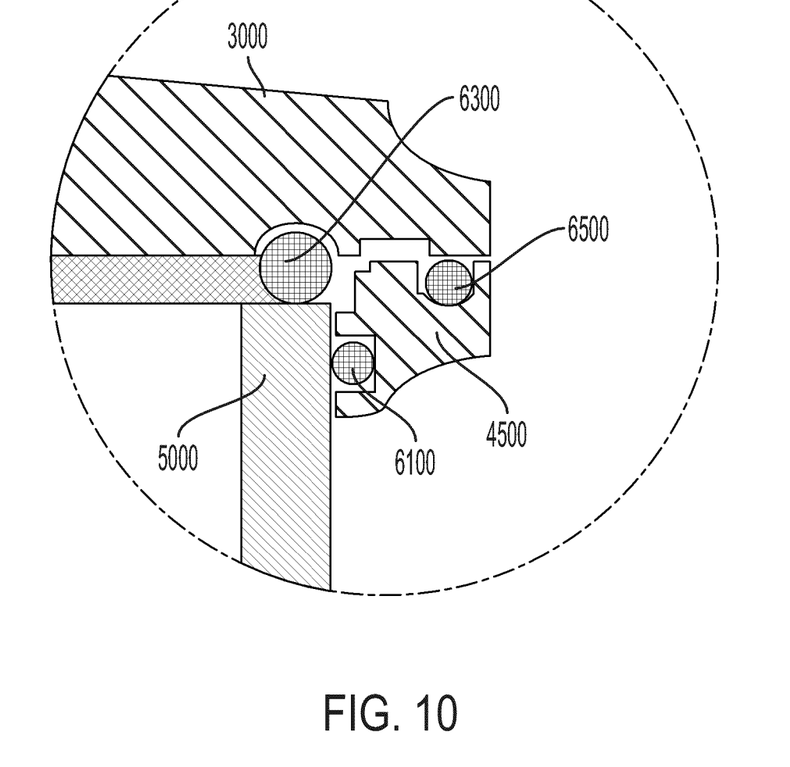
FIG. 10 is an enlarged cutaway view of the attachment section of the second embodiment in a bubble trap shown in FIG. 7.

Another embodiment is the use of this seal in a bubble trap as shown in FIGS. 7 to 9. FIG. 7 is the cutaway of the bubble trap showing the described seal without the clamps. One of the seals is in the upper right hand corner and identified by the dashed circle. FIG. 8 is perspective view of the bubble trap showing the clamps at both flanges holding the tube to each flange. FIG. 9 is a straight on view showing the clamp holding the flange and tube together.

In the bubble trap, one of the flanges, the first flange, has two openings with the liquid and vapor entering the chamber through one of the ports in the first flange. The vapor disengages from the liquid and exits the port in the other flange, the second flange. The liquid then drains out the second port in the first flange.

One of ordinary skill will recognize that having the aseptic gasket seat in the flange and the aseptic surface on the tube body is an equivalent to having the aseptic gasket seat in the tube body and the aseptic surface on the flange.

In this manner, environmental contamination is kept out from in-between the tube body and flange.

Other advantages are that the force is applied in one direction to the gasket, the gasket cannot be strained longitudinally as is inherent with a screwed flange design.

The device is aseptic due to the addition of aseptic seal, i.e. the external O-ring.

There is a labyrinth design with capillary fluid barriers to halt external media migrating to process side.

The gasket compression is controlled with metal to metal contact. Once the flange and tube body meet, the compression fixed the same each time for a given gasket.

It is easy to assemble and disassemble in the field.

As there are no large screw threads to clean there is less [ ] time.

In some application the system requires welded ends. In that case, the tube body and flanges can be disassembled in place to change the sealing gaskets, aseptic gaskets or the transparent tube.

This assembly can also be provided as a kit having the above components and their inventive characteristics.

What is claimed is:
1. An assembly (100) comprising;
an assembly longitudinal axis (200), a tube body (4000), a first flange (2000), a transparent tube (5100), a first seal gasket (6200), a first attachment mechanism (1000), a first placement holder (6000); wherein
the tube body has a tube body longitudinal axis (4030), a tube body first end (4400) which has a tube body first end contact surface (4450), a tube body second end (4500), a tube body inside diameter (4200), a window (4100);
the transparent tube has a transparent tube first end (5100), a transparent tube first end contact surface (5200), a transparent tube second end (5150), a transparent tube second end contact surface (5250), a transparent tube inside diameter (5300), a transparent tube outside diameter (5250) which is less than the tube body inside diameter, a transparent tube longitudinal axis (5300),
the first flange having a first flange longitudinal axis (2030), a first flange seal end (2100), a first flange connection end (2200), a first flange seal surface (2300), a first flange set surface (2500); and
wherein the transparent tube is located inside the tube body;
the first placement holder is separate from the first flange, is located between the tube body and the transparent tube, and is in contact with the transparent tube;
the assembly longitudinal axis, the tube body longitudinal axis, the transparent tube longitudinal axis, and the first flange longitudinal axis are on substantially the same line;

the tube body first end contact surface touching the first flange set surface, fixing a volume of the first seal gasket to prevent over or under torquing of the gasket; and a portion of the first seal gasket is under pressure and in contact with the first flange seal surface and the transparent tube first end contact surface.

2. The assembly of claim 1, wherein the assembly is a bubble trap.

3. The assembly of claim 1, further comprising a second flange (3000), a second seal gasket (6300), a second attachment mechanism (1500);
   wherein the tube body second end (4500) has a tube body second end contact surface (4550), a second placement holder (6100);
   the second flange having a second flange longitudinal axis (3030), a second flange seal end (3100), a second flange connection end (3200), a second flange seal surface (3300), a second flange set surface (3500); and
   wherein the assembly longitudinal axis and the second flange longitudinal axis are substantially on the same line;
   the second placement holder is separate from the second flange, is located between the tube body and the transparent tube and is in contact with the transparent tube;
   the tube body second end contact surface touching the second flange set surface; and
   a portion of the second seal gasket is under pressure and in contact with the second flange seal surface and the transparent tube second end contact surface.

4. The assembly of claim 3, wherein there is an aseptic seal formed by an aseptic seat, an aseptic surface, and an aseptic gasket.

5. The assembly of claim 3, wherein there is at least one force applied to the first seal gasket parallel with the assembly longitudinal axis and there is no torque applied to the first seal gasket.

6. The assembly of claim 3, wherein there is a first placement holder (6000) between the tube body and the transparent tube.

7. The assembly of claim 3, wherein the assembly is a bubble trap.

8. The assembly of claim 1, wherein there is an aseptic seal formed by an aseptic seat, an aseptic surface, and an aseptic gasket.

9. The assembly of claim 8, wherein there is at least one force applied to the first seal gasket parallel with the assembly longitudinal axis and there is no torque applied to the first seal gasket.

10. The assembly of claim 8, wherein there is a first placement holder (6000) between the tube body and the transparent tube.

11. The assembly of claim 8, wherein the assembly is a bubble trap.

12. The assembly of claim 1, wherein there is at least one force applied to the first seal gasket parallel with the assembly longitudinal axis and there is no torque applied to the first seal gasket.

13. The assembly of claim 12, wherein there is a first placement holder (6000) between the tube body and the transparent tube.

14. The assembly of claim 12, wherein the assembly is a bubble trap.

15. A kit for making the assembly of claim 1 comprising:
   the tube body, the first flange, the transparent tube, the first seal gasket, and the first attachment mechanism,
      wherein the transparent tube is configured to be located inside the tube body;
      the assembly longitudinal axis, the tube body longitudinal axis, the transparent tube longitudinal axis, and the first flange longitudinal axis are configured to be in substantially the same line;
      the tube body first end contact surface is configured to touch the first flange set surface, fixing the volume of the first seal gasket to prevent over or under torquing of the gasket; and
      at least a portion of the first seal gasket is configured to be under pressure and in contact with the first flange seal surface and the transparent tube first end contact surface.

16. The kit of claim 15 further comprising:
   a second flange, a second seal gasket, and a second attachment mechanism,
      wherein the assembly longitudinal axis and the second flange longitudinal axis are configured to be substantially on the same line;
      the tube body second end contact surface is configured to touch the second flange set surface; and
      at least a portion of the second seal gasket is configured to be under pressure and in contact with the second flange seal surface and the transparent tube second end contact surface.

17. The kit of claim 15 further comprising:
   one or more aseptic seals, an aseptic seat, an aseptic surface, and an aseptic gasket, wherein the one or more aseptic seals are configured to be formed by the aseptic seat, the aseptic surface, and the aseptic gasket.

18. The kit of claim 15 further comprising:
   a first placement holder, wherein
      the first placement holder is configured to be located between the tube body and the transparent tube.

* * * * *